United States Patent
Aaltonen et al.

(10) Patent No.: US 7,103,311 B2
(45) Date of Patent: Sep. 5, 2006

(54) SYSTEM AND METHOD FOR DYNAMICALLY CONFIGURING A CELLULAR RADIO NETWORK TOPOLOGY BASED ON CONTENT DEMAND

(75) Inventors: Janne Aaltonen, Turku (FI); Juha Salo, Littoinen (FI); Rod Walsh, Tampere (FI); Kari Reponen, Kontio (FI); Stephen Wasko, Basingstoke (GB)

(73) Assignee: Nokia Corporation, Espoo (FI)

( * ) Notice: Subject to any disclaimer, the term of this patent is extended or adjusted under 35 U.S.C. 154(b) by 796 days.

(21) Appl. No.: 09/893,590

(22) Filed: Jun. 29, 2001

(65) Prior Publication Data

US 2002/0025826 A1    Feb. 28, 2002

(30) Foreign Application Priority Data

Jun. 30, 2000   (GB)   .................... 0016064.8

(51) Int. Cl.
*H04H 1/00* (2006.01)
*H04B 7/00* (2006.01)

(52) U.S. Cl. .................. 455/3.04; 455/525; 455/452.2; 348/423

(58) Field of Classification Search .............. 455/3.01, 455/3.02, 3.03, 3.04, 3.05, 443, 453, 466, 455/180.1, 66.1, 344, 552.1, 3.06, 12.1, 444, 455/524, 452.2, 525; 348/423
See application file for complete search history.

(56) References Cited

U.S. PATENT DOCUMENTS

| | | | |
|---|---|---|---|
| 5,241,685 A * | 8/1993 | Bodin et al. ................ | 455/453 |
| 5,651,010 A * | 7/1997 | Kostreski et al. ........... | 370/537 |
| 5,790,958 A * | 8/1998 | McCoy et al. .............. | 455/557 |
| 5,802,473 A * | 9/1998 | Rutledge et al. ............ | 455/446 |
| 5,920,813 A * | 7/1999 | Evans et al. ............... | 455/422.1 |
| 6,130,898 A * | 10/2000 | Kostreski et al. ........... | 370/522 |
| 6,163,683 A * | 12/2000 | Dunn et al. ............... | 455/151.1 |
| 6,300,880 B1 * | 10/2001 | Sitnik .................... | 340/825.25 |
| 6,577,849 B1 * | 6/2003 | Eaton et al. ............... | 455/3.01 |

FOREIGN PATENT DOCUMENTS

| | | |
|---|---|---|
| EP | 627830 | 12/1994 |
| GB | 2281011 | 2/1995 |
| WO | 9312587 | 6/1993 |
| WO | 9323935 | 11/1993 |
| WO | 9522210 | 8/1995 |
| WO | 95/25409 | 9/1995 |
| WO | 99/33076 | 7/1999 |
| WO | 9933076 | 7/1999 |
| WO | 9960659 | 11/1999 |

OTHER PUBLICATIONS

European Telecommunication Standard, Nov. 1997.
European Telecommunication Standard, Aug. 1997.
European Telecommunication EN 301 195 V1.1.1 (Feb. 1999).
ETSI Technical Report Aug. Aug. 1997 second edition.

* cited by examiner

*Primary Examiner*—Tilahun Gesesse
(74) *Attorney, Agent, or Firm*—Banner & Witcoff, Ltd

(57) ABSTRACT

A broadband digital broadcast 1 network is described in which the cellular topology is dynamically configurable to maintain spectral efficiency. The reconfiguration of the topology occurs in response to changes in the demand for content. Thus, a single cell could be defined to cover an area in which the same content is being delivered to a substantial number of users. Conversely, a large number of cells could be defined to cover an area in which a substantial number of users are each having different content delivered to them.

41 Claims, 4 Drawing Sheets

SYSTEM AND METHOD FOR DYNAMICALLY CONFIGURING A CELLULAR RADIO NETWORK TOPOLOGY BASED ON CONTENT DEMAND

BACKGROUND OF THE INVENTION

The present invention relates to content delivery over a cellular radio network, particularly although not exclusively a broadband digital broadcast network.

In a cellular radio network, each cell may be capable of transmitting content on a particular frequency chosen to meet the frequency re-use requirements of the network. The spectral efficiency of such a network is reduced if the network is capable of delivering content, as in the case of a broadband digital broadcast network, as a broadcast to every cell in the network or as a multicast to a subset of cells in the network Such a situation arises in the case of the well-known terrestrial Digital Video Broadcasting (DVB-T) system found in Europe.

FIG. 1, illustrates a prior art broadband digital broadcast network which lacks spectral efficiency as the same content is being delivered using different frequencies in different cells. Thus, in the Figure, the network 1 is made up of a plurality of cells A to K utilising seven frequencies f1 to f7 and content is being multicast to terminals in cells A, B and C on three respective frequencies namely f1, f2 and f3.

SUMMARY OF THE INVENTION

Thus, according to a first aspect of the present invention, there is provided a broadcast system for delivering content to a terminal, including a plurality of transmitters, the transmission characteristics of which define a network topology and a network controller responsive to distribution of demand for specific content to determine an appropriate network topology by varying the transmission characteristics of at least one of the transmitters.

Consequently, there is a resulting improvement in the spectral efficiency of the network. In particular, it is possible to utilise more effectively the available bandwidth in areas served by both local and overlying regional cells. Advantageously, the topology of the network may be configured to meet a predetermined demand for a service, Such a demand could arise where an advertisement is intended to be pushed by a third party such as a content provider. Alternatively, the predetermined demand could arise from service covering a "live event" such as a sporting fixture at a stadium, for example.

Where the service is on a "pay-for-view" basis, an appropriate conditional access scheme could be utilised to prevent unauthorised access to the content which is not, of course, restricted to visual data. A description of an application of conditional access to the delivery of content over a broadband digital broadcast network can be found in the European Telecommunication Standards Institute (ETSI) Publication entitled—Digital Video Broadcasting (DVB)—Guidelines on implementation and usage of service information (SI)—ETR—211. This publication contains further references to other publications useful in understanding Conditional Access.

Preferably, the system will signal changes in the cell size due to the change in network topology to terminals receiving the content. Such signalling could be delivered with the content or provided on a separate bearer such as via a cellular mobile handset either integrated with the terminal or linked thereto. Thus, each terminal will have access to service information which will permit the terminal to follow a broadcast as its parameters change in response to a reconfiguration of the topology. Conveniently, the controller will configure the topology by altering transmitter characteristics, including, but not limited to the following operational characteristics, namely transmission power, direction, frequency and time slots. Consequently, the relative size of a cell delivering content may be varied to meet the demand for common, that is the same content and also different content in areas covered by the system. As an alternative to a network controller led change in network topology, such a change could be initiated by a request from a terminal. An example of a terminal led change might arise where the terminal was being used to coordinate an emergency situation and further network resources were need in the incident area to assist in dealing with the emergency situation. In a further alternative to a network controller led change in topology, a service provider outside of the network might firstly seek confirmation that the terminals could receive content following a potential network reconfiguration. Subsequently, when sufficient terminals have responded in the affirmative, the service provider would authorise reconfiguration.

According to a further aspect of the invention, there is provided a method of delivering content to terminals over a network whose topology is defined by the transmission characteristics of a plurality of transmitters, comprising analysing the content to be delivered together with its destination and varying the transmitter transmission characteristics accordingly.

Preferably, the number of cells defined by the transmitters is reduced in an area in which substantially the same content is being delivered to terminals. Similarly, the number of cells defined by the transmitters is increased in an area in which different content is being delivered to terminals.

According to a still further aspect of the invention, there is provided a broadcast system having a plurality of transmitters for delivering content to terminals in respective locations each transmitter operating in accordance with a set of operational characteristics comprising:
  means for determining a distribution of terminals for delivery of common content; and
  means for varying the operational characteristics of a transmitter responsive to the determined distribution of terminals.

According to a yet further aspect of the invention, there is provided a method using a plurality of transmitters for delivering content to terminals in respective locations comprising determining a distribution of terminals receiving common content and varying a set of operational characteristics of a transmitter responsive to the distribution of terminals.

According to a yet further aspect of the invention, there is provided a terminal for receiving content from a broadcast network having a plurality of transmitters for delivering content to terminals in respective locations each transmitter operating in accordance with a variable set of operational characteristics, the terminal comprising means operable to receive a signal indicative of the operational characteristics of a transmitter whereby the receiving means is operable to receive content delivered in accordance with the signal.

According to yet another aspect of the invention there is provided a method of receiving content from a broadcast network having a plurality of transmitters each transmitter operating in accordance with a variable set of operational characteristics, the method comprising receiving a signal indicative of operational characteristics of a transmitter delivery said content and changing reception characteristics in accordance therewith.

BRIEF DESCRIPTION OF THE DRAWINGS

In order to aid in understanding the present invention, a particular embodiment thereof will now be described by way of example and with reference to the accompanying drawings, in which.

DETAILED DESCRIPTION OF THE INVENTION

Figure 2:
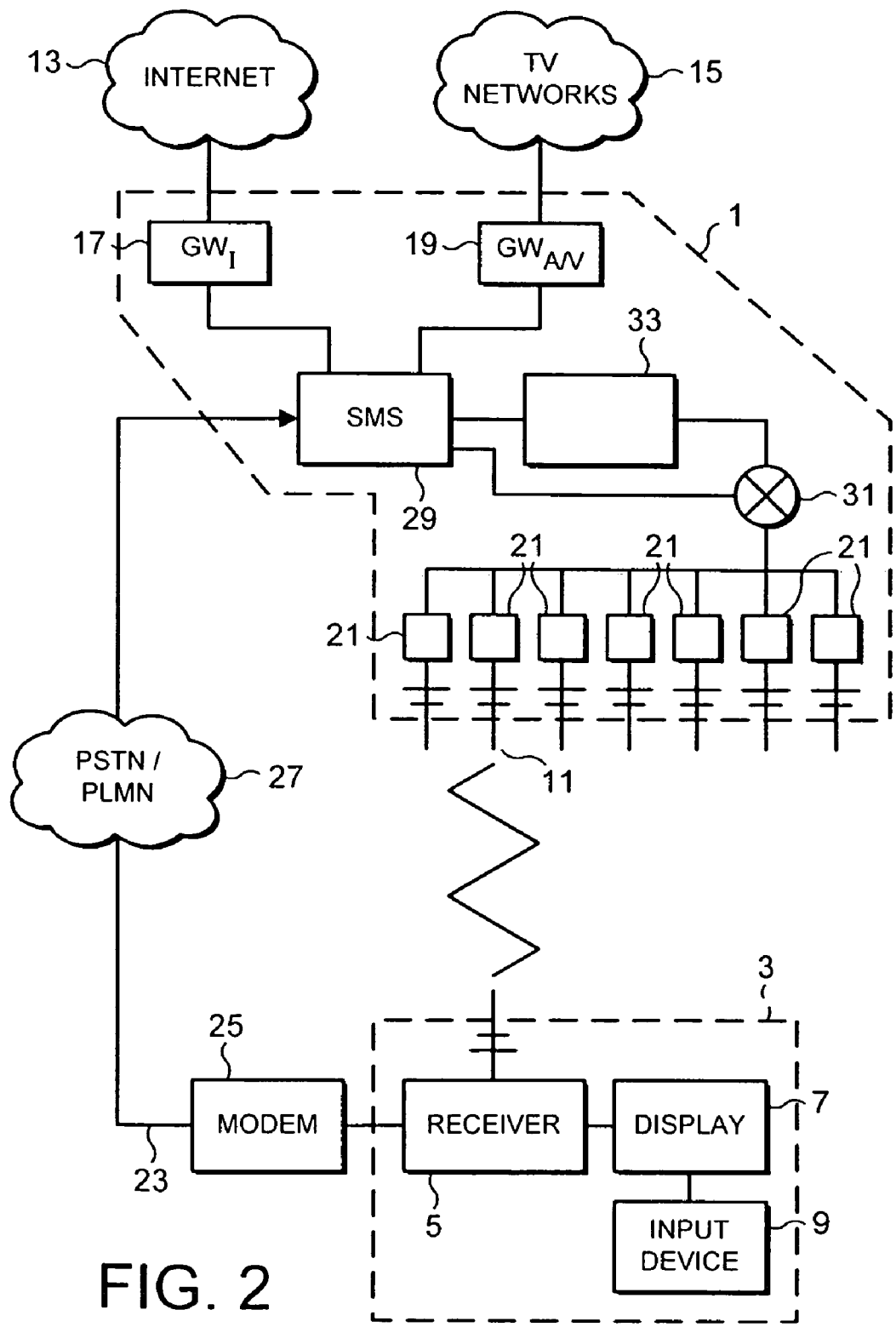
FIG. 2 is a diagram illustrating a broadband digital broadcast network according to the invention.

Referring to FIG. 2, this shows an example of a terrestrial broadband digital broadcast network namely a digital video broadcast (DVB-T) network 1. A user equipped with a suitable terminal 3 incorporating a receiver 5, display 7 and user interface 9, can receive data broadcast by the network 1 from a transmitter 11 forming part of the network 1. The data broadcast by the transmitter 11 is derived from a variety of sources 13,15 via gateways 17,19 and may respectively include IP and Television content.

Before transmission, the data received from each source 13,15 is processed in head-end equipment 21. As is well known in the art, the head end equipment places the data into MPEG-based data containers. To cater for the delivery of data to a particular terminal 3 or group of terminals, the containers may also hold address information which can be identified and read by a conditional access component in the terminal 3 to determine whether the data is intended for that terminal. The network 1 also provides the facility for suitably equipped terminals to interact with the network. By suitably equipped terminal 3 is meant a terminal having a return channel for providing network interactivity as exemplified in the case of DVB by a number of specifications published by the Digital Video Broadcasting Office and also the European Telecommunications Standards Institute (ETSI) including the following: DVB-NIP Network Independent Protocols for DVB Interactive Services ETS 300 802 (V1: 11/97), Guidelines for the use of the Network Independent Protocols for DVB Interactive Services TR 101 194 (V1.1.1: 06/97), DVB-RCP DVB interaction channel through the Public Switched Telecommunications System (PSTN)/Integrated Services Digital Network (ISDN) ETS 300 801 (V1: 08/97), DVB-RCG Interaction channel through the Global System for Mobile communications (GSM) EN 301 195 (V1.1.1: 02/99).

Thus, a user may request the delivery of a computer file from the network to her terminal. Such interactive functionality requires a return channel 23 from the terminal 3 to the DVB-T network 1 and a conditional access component in the terminal 3. The return channel 23 can be provided in the from of a dial-up connection using a modem 25 connected to the terminal 3 which establishes a connection over a telecommunications network 27 to a subscriber management system (SMS) 29 of the DVB-T network 1. The subscriber management system 29 has connections to both the gateways 17,19 and the transmitter head-end equipment 21. It is thus possible for the user to issue requests for specific content via the user interface 9 of the terminal 3. The request is received by the SMS 29 which obtains the content from the relevant gateway 17,19 and passes it to the head-end 21 for placing into data containers for onward transmission. It should be noted that the request from the user might include content which is not presently being transmitted by the network 1. To ensure that the user only receives the requested content, the data is broadcast with an identifier which the conditional access component in the terminal 3 recognises as being intended for delivery to the user. In the event that the content is received by another terminal, the conditional access component of that terminal will prevent delivery of the content.

The network further includes a router 31 which ensures that content is delivered to the head end 21 of the correct transmitter 11 or transmitters in accordance with instructions received from a controller 33. The controller 33 monitors the requests for content being handled by the SMS 29. Depending on the nature of the requests being received, the controller 33 will ensure an appropriate allocation of transmitters and frequencies to deliver the content whilst at the same time seeking to maintain the spectral efficiency of the network 1 over time. Thus, the controller 33 will identify not only what content is being requested but also to where it is to be delivered. In order that the controller 33 is able to reconfigure the network dynamically to meet demand, the controller 33 can instruct a change in the power of a transmitter, a change in transmission direction of a transmitter, a change in a transmission frequency of a transmitter and also switch on/off a transmitter.

Figure 1:
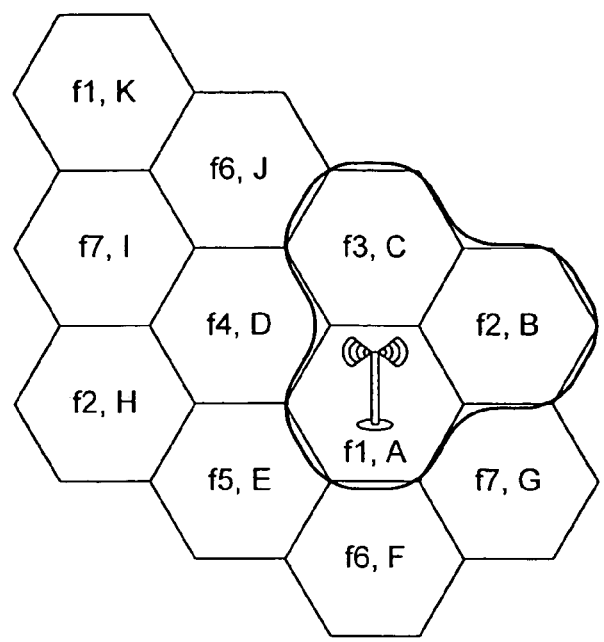
FIG. 1 is a diagram illustrating a typical prior art cellular network structure.
Figure 3:
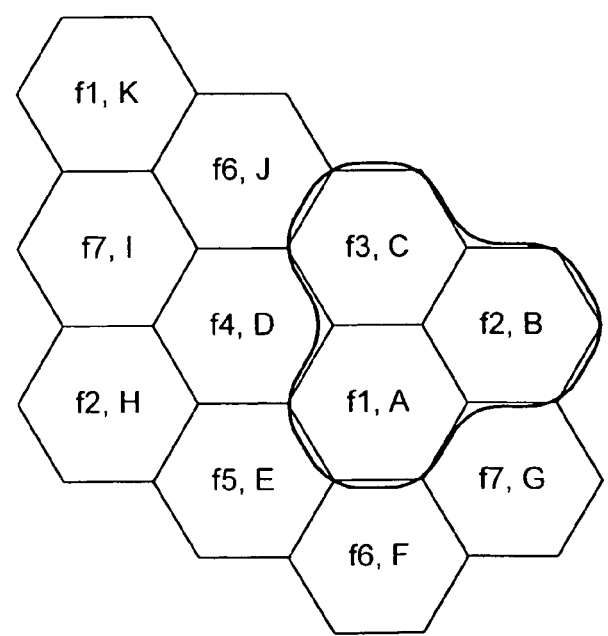
FIG. 3 is a diagram illustrating a topology of the network of FIG. 2.
Figure 4A:
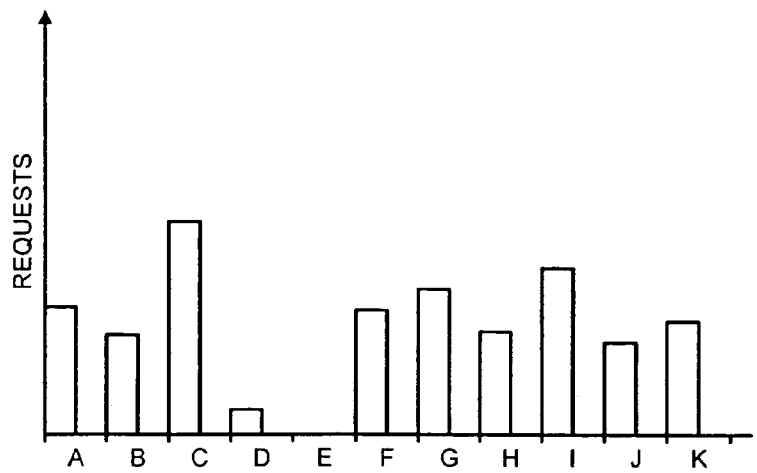
FIGS. 4a, 4b and 4c are each a graphical representation of a particular content delivery scenario in the network of FIG. 2.
Figure 4B:
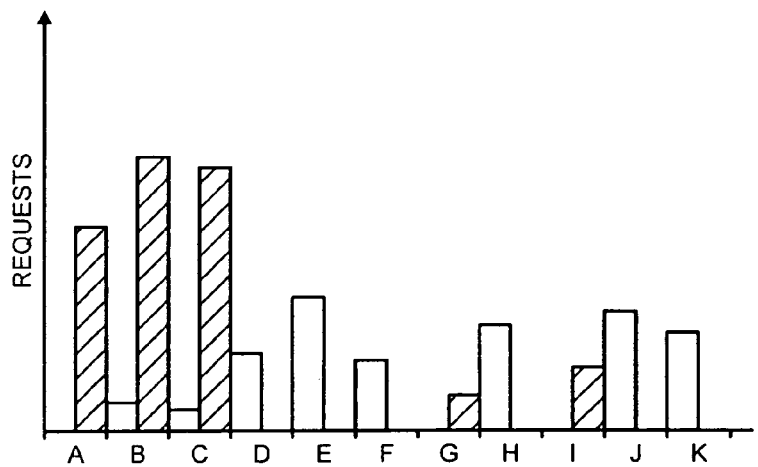
Figure 4C:
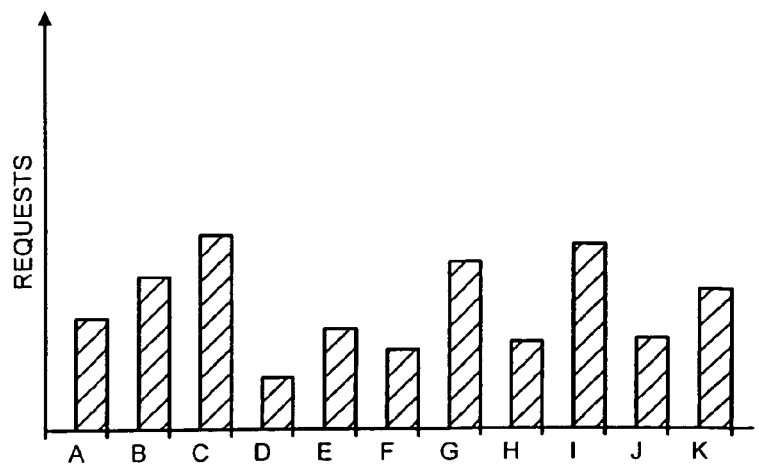

Turning to FIG. 3, there is shown a network structure made up of eleven areas corresponding to cells A to K, to which have been allocated seven frequencies f1 to f7. Three different scenarios relating to the number and nature of requests for delivery in each area of the network are illustrated in FIGS. 4a, 4b and 4c. The graphs set out in the Figures represent the number of requests for delivery in each area using two separate columns. The left hand (unhatched) column for each area represents the total number of requests for delivery of unique content, that is content for delivery to a particular terminal which content is not simultaneously being delivered to any other terminal in that network. An example of such a content could be a page of a particular website. The right hand hatched column is indicative of the number of requests for delivery of common content, that is content for delivery to a particular terminal which content is being simultaneously delivered to other terminals in the network. An example of such content might be the delivery of commentary for a sporting event.

With respect to the scenario illustrated in FIG. 4a, it is apparent that in no area are there any requests for common content. Thus the controller 33 having been provided with the information illustrated in the Figure i.e. what content is being delivered and where is it to be delivered, recognises that the spectral efficiency of the network 1 can be optimised by adopting a unicast configuration in which distinct frequencies are allocated to each area for delivery of content to the terminals. Thus, the network configuration or topology adopted will in fact be illustrated by FIG. 3.

Figure 5:
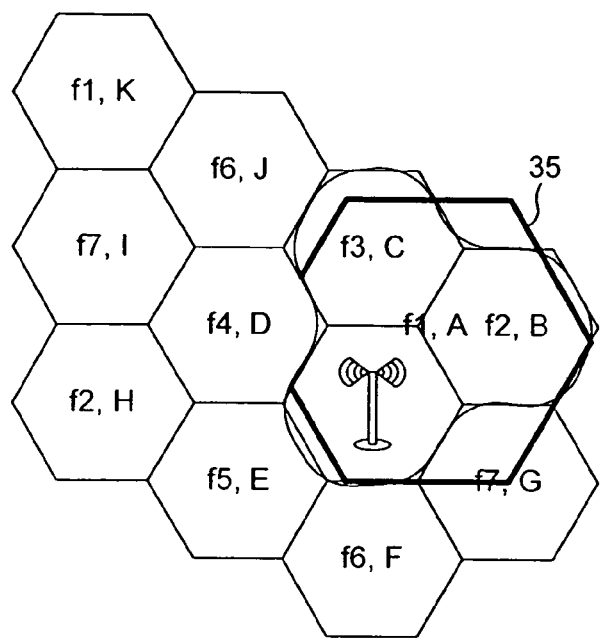
FIG. 5 is a diagram illustrating a further topology of the network of FIG. 2.

FIG. 4b illustrates a scenario in which a large number of requests for delivery of common content are present in areas A, B and C. In addition, a smaller number of delivery requests for common content are present in area H and area I. It should also be noted that no requests are present for unique content in area A and the number of such requests in areas B and C are significantly outnumbered by the requests for common content. The controller 33 having been provided with the information illustrated in the Figure, recognises that the spectral efficiency may be improved in the areas A, B and C by reconfiguring the transmitter in area A to deliver the common content to those three areas on a single frequency f1 the extent of coverage being shown by the large hexagon 35 in FIG. 5. Area A is selected by the controller 33 to be the best choice for reconfiguring in this instance because no unique content is required for delivery to terminals in that area. At the same time, the controller 33 instructs the router 29 to deliver the unique content to terminals in area B and area C using a dedicated frequency in each case, namely f2 and f3 respectively. The controller 33 also recognises the presence of requests for common content delivery in areas G and I as has already been mentioned. In this case, the controller deems, in accordance with a pre-determined threshold that the relatively low number of requests for common content in these areas together with the absence of any geographical proximity renders further reconfiguration of the network unnecessary.

Figure 6:
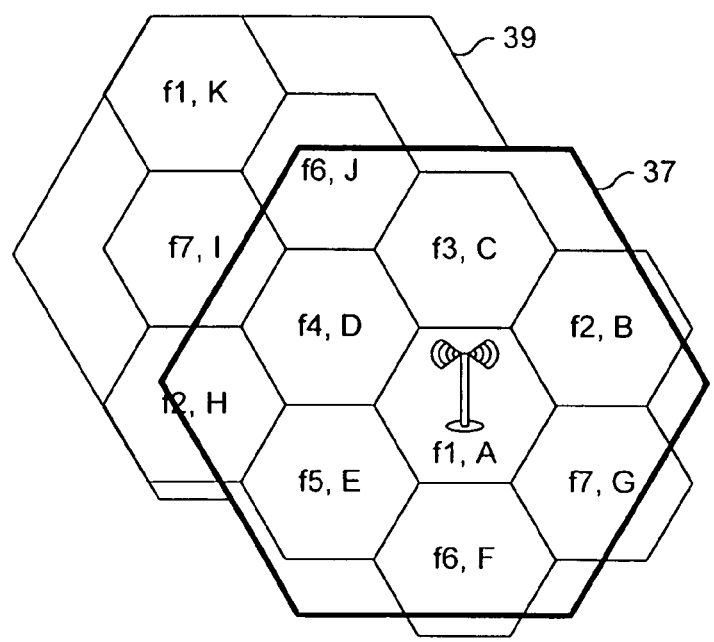
FIG. 6 is a diagram illustrating a still further topology of the network of FIG. 2.

FIG. 4c, illustrates a scenario where all the delivery requests in the network 1 are for common content. In these circumstances the controller 33 having been provided with the information illustrated in the FIG. 4c, recognises that the spectral efficiency may be improved by configuring the network as a single frequency network (SFN) as shown in FIG. 6. Thus, the transmitters 11 in areas A and K both presently operating on f1 have their output boosted so that their respective areas of coverage are shown as the two large hexagons 37,39 on FIG. 6. In a non-illustrated variant, rather than select the transmitters 11 in area A and area K to deliver the content at f1, a SFN could be configured by selecting area F and area I and having them transmit the content on f2, for example. Clearly, this would necessitate further changes to the network 1 to avoid interference with content being delivered by areas H and B, hitherto operating on frequency f2. Thus areas H and B could be reconfigured to operate on a different frequency or even turned off. Alternatively, in a non-illustrated variant, the same result could be achieved by switching the frequency of all cells in the network to f1 to form an SFN.

Another scenario could arise where a regional broadcast cell (not shown) is superimposed on areas A to K, using frequency f8. In normal conditions, the presence of this regional cell would have no impact on the operation of the topology of the cellular structure beneath it which would continue to operate in the manner exemplified by the scenarios referred to above. However, should the demand for content delivered over the regional broadcast cell exceed the available bandwidth, rather than deny service to terminals 3, the controller 33 could, in response to such an event, allocate some of the underlying area frequencies to the regional broadcast, at least for the period of excess demand on the regional broadcast cell. Although this would temporarily reduce the bandwidth available for local area content delivery, it would have an overall effect of improving spectral efficiency. However, care would need to be taken by the controller in assigning bandwidth from the underlying areas so as not to remove bandwidth from so-called guaranteed services, an example being a local broadcaster providing content such as commercial radio.

It will be recognised by those skilled in the art that as a result of the change in network topology described above, the terminals receiving the content must be made aware of service changes, for example, changes in the frequency of transmissions carrying the desired content. Information relating to service changes is generated by the controller 33 and is carried in-band with the content for delivery to a terminal 3 effected by the change. In the case of a DVB network 1 for example, the service change information could be implemented under the Service Delivery/Service Announcement Protocols (SDP/SAP) of the Internet Protocol (IP) suite. These protocols are then used to announce, cancel and re-assign parameters of service including start and end times, IP address, frequency and the like. Although such messages would usually be processed by the processor without user intervention at the User Interface (UI) level an example of some such messages in human readable form could include "the file download continues in n seconds on frequency f" where n and f are defined. The terminal would then respond by changing to the new frequency to continue with the download. Another message might be "this service has now terminated on this frequency, please consult the service descriptors to find out its new location" in which case the terminal would check a previously downloaded set of service information (SI) data to find the service location or consult a service information channel provided over the network. In all the above cases, the messaging will be unidirectional in the sense that no acknowledgement is needed of receipt.

It will be appreciated by those skilled in the art that, the physical separation of the transmitters on the same frequency (but with different content) needs to be sufficient to ensure that a sufficient carrier to interference ratio (C/I) is maintained. As a rough approximation, the C/I can be calculated from the cellular topology of FIG. 3 in which the cell size is uniform. Thus, on the assumption that cells A and I are transmitting at the same level and on the same frequency (but with different content) and assuming the distance from A to the edge of its cell is d, then the distance from I to the edge of cell A is 3*d. Assuming, also, a roughly approximate propagation loss factor of 35 dB per decade (10 times) distance, this leads to a C/I value of about 17 dB. This is sufficient to receive up to 17 Mbps data through the DVB system, for example. If higher rates are needed, then either a larger physical separation is needed or the cells must be isolated further by antenna design or through utilising obstructions (e.g. buildings).

What is claimed is:

1. A broadcast system for delivering content to a plurality of terminals, comprising:

a plurality of transmitters having transmission characteristics which define a network topology;

a communications interface for providing a return channel for the plurality of terminals to request content from a broadcast network; and a network controller operatively coupled with the plurality of transmitters and the communications interface, the network controller configured to determine distribution of terminals requesting common content based on information received through the communications interface and reconfiguring the network topology by varying the transmission characteristics of at least one of the transmitters, wherein the varying of the transmission characteristics is based on the determined distribution of terminals requesting common content.

2. A system as claimed in claim 1, further comprising signaling means for providing information relating to the network topology for delivery to a terminal.

3. A system as claimed in claim 2, wherein the network controller is configured to modify the topology to reduce a number of cells in an area where common content is delivered to a plurality terminals in the area.

4. A system as claimed in claim 2, wherein the network controller is operable to modify the topology to increase a number of cells in an area where a plurality of different content is being delivered to a plurality of different terminals in the area.

5. A system as claimed in claim 2, including a further transmitter delivering content to an area overlying at least the network topology determined by the controller.

6. A system as claimed in claim 2, wherein said plurality of transmitters comprises at least three transmitters.

7. A system as claimed in claim 2, wherein said transmitter characteristics are varied according to at least one of frequency, antenna directivity and transmission power.

8. A system as claimed in claim 1, wherein the network controller is operable to modify the topology to reduce a number of cells in an area where common content is being delivered to a plurality of terminals in the area.

9. A system as claimed in claim 8, wherein the network controller is operable to modify the topology to increase a number of cells in an area where a plurality of different content is being delivered to a plurality of different terminal in the area.

10. A system as claimed in claim 8, including a further transmitter delivering content to an area overlying at least the network topology determined by the controller.

11. A system as claimed in claim 8, wherein at least two transmitters said plurality of transmitters comprises at least three transmitters.

12. A system as claimed in claim 8, wherein said transmitter characteristics are varied according to at least one of frequency, antenna directivity and transmission power.

13. A system as claimed in claim 1, wherein the network controller is operable to modify the topology to increase a number of cells in an area where a plurality of different content is being delivered to a plurality of different terminals in the area.

14. A system as claimed in claim 13, including a further transmitter delivering content to an area overlying at least the network topology determined by the controller.

15. A system as claimed in claim 13, wherein said plurality of transmitters comprises at least three transmitters.

16. A system as claimed in claim 13, wherein said transmitter characteristics are varied according to at least one of frequency, antenna directivity and transmission power.

17. A system as claimed in claim 1, further comprising an additional transmitter for delivering content to an area overlying at least the network topology.

18. A system as claimed in claim 17, wherein the network controller is configured to modify the topology to deliver, in at least one cell, the content being delivered by the further additional transmitter.

19. A system as claimed in claim 18, wherein said plurality of transmitters comprises at least three transmitters.

20. A system as claimed in claim 18, wherein said transmitter characteristics are varied according to at least one of frequency, antenna directivity and transmission power.

21. A system as claimed in claim 17, wherein said plurality of transmitters comprises at least three transmitters.

22. A system as claimed in claim 17, wherein said transmitter characteristics are varied according to at least one of frequency, antenna directivity and transmission power.

23. A system as claimed in claim 1, wherein said plurality of transmitters comprises at least three transmitters.

24. A method as claimed in claim 23, wherein the transmitter characteristics are varied such that cellular density of the topology is increased in an area where a plurality of different content is being delivered to a plurality of different terminals in the area.

25. A system as claimed in claim 1, wherein said transmitter characteristics are varied according to at least one of frequency, antenna directivity and transmission power.

26. A method of delivering content to a plurality of terminals, in response to one or more content requests from the plurality of terminals, over a broadcast network whose topology is defined by transmission characteristics of a plurality of transmitters, comprising the steps of:
analyzing the content to be delivered together with its destination;
determining a distribution of terminals requesting common content based on information received through a communications interface coupled to a network controller, wherein the communications interface provides a return channel for the plurality of terminals to request content from the broadcast network; and
varying the transmitter transmission characteristics based on the determined distribution of terminals requesting common content.

27. A method as claimed in claim 26, wherein the transmitter characteristics are varied such that cellular density of the topology is reduced in an area where common content is being delivered to a plurality of terminals in the area.

28. A method as claimed in claim 27, wherein the transmitter characteristics are varied such that cellular density of the topology is increased in an area where a plurality of different content is being delivered to a plurality of different terminals in the area.

29. A computer program comprising executable code for execution when loaded on a computer, wherein the computer is operable in accordance with said code to carry out the method according to claim 27.

30. A method as claimed in claim 26, wherein the transmitter characteristics are varied such that the cellular density of the topology is increased in an area where a plurality of different content is being delivered to a plurality of different terminals in the area.

31. A computer program comprising executable code for execution when loaded on a computer, wherein the computer is operable in accordance with said code to carry out the method according to claim 30.

32. A computer program comprising executable code for execution when loaded on a computer, wherein the computer is operable in accordance with said code to carry out the method according to claim 26.

33. A computer program as claimed in claim 32, stored on a computer readable medium.

34. A broadcast system having a network controller operatively coupled to a communications interface and a plurality of transmitters for delivering content to a plurality of terminals in respective locations with each transmitter operating in accordance with a set of operational characteristics comprising:
means for determining a distribution of terminals requesting common content based on information received through the communications interface; and means for varying the operational characteristics of a transmitter based on the determined distribution of terminals requesting common content, wherein the varied operational characteristics of the transmitter define a network topology, and wherein the communications interface provides a return channel for the plurality of terminals to request content from the broadcast network.

35. A method of using a plurality of transmitters for delivering content to terminals in respective locations comprising the steps of:

determining a distribution of terminals requesting common content from a broadcast network; and varying a set of operational characteristics of a transmitter based on the determined distribution of terminals requesting common content, wherein the terminals request content through a return channel provided by a communications interface of the broadcast network.

36. A terminal for receiving content transmitted from a broadcast network, the broadcast network having a network controller operatively coupled to a communications interface and a plurality of transmitters for delivering content to a plurality of terminals with each transmitter operating in accordance with a variable set of operational characteristics and each of the plurality terminals comprising means operable to receive a signal indicative of the operational characteristics of a transmitter whereby the means operable to receive is operable to receive content delivered in accordance with the signals; and wherein the operational characteristics of the transmitter define a network topology, wherein the communications interface provides a return channel for the plurality of terminals to request content from the broadcast network;

wherein the broadcast network determines a distribution of terminals requesting common content based on information received through the communications interface, and wherein the operational characteristics of each of the plurality of transmitters are varied based on the determined distribution of terminals to which common content is being delivered.

37. A method for receiving content from a broadcast network having a network controller operatively coupled to a communications interface and a plurality of transmitters, wherein each transmitter operates in accordance with a variable set of operational characteristics, the method comprising the steps of:

receiving a signal indicative of operational characteristics of a transmitter delivering said content; and changing reception characteristics in accordance with the received signal, the operational characteristics of the transmitter defining a network topology, wherein the communications interface provides a return channel for a plurality of terminals to request content from the broadcast network, wherein the broadcast network determines a distribution of terminals in the network requesting common content based on information received through the communications interface, and wherein the set of operational characteristics of the transmitter is varied based on the determined distribution of terminals in the network receiving common content.

38. A method as claimed in claim 37, further comprising the step of consulting a further signal for said reception characteristics required to receive said content.

39. A computer program comprising executable code for execution when loaded on a computer, wherein the computer is operable in accordance with said code to carry out the method according to claim 38.

40. A computer program comprising executable code for execution when loaded on a computer, wherein the computer is operable in accordance with said code to carry out the method according to claim 37.

41. A computer program as claimed in 40, stored on a computer readable medium.

* * * * *